US008327817B2

(12) United States Patent
Palazzolo et al.

(10) Patent No.: US 8,327,817 B2
(45) Date of Patent: Dec. 11, 2012

(54) AUTOMOTIVE ENGINE BEARING

(75) Inventors: Christopher Kelly Palazzolo, Ann Arbor, MI (US); Daryl Self, Trenton, MI (US)

(73) Assignee: Ford Global Technologies, Dearborn, MI (US)

( * ) Notice: Subject to any disclaimer, the term of this patent is extended or adjusted under 35 U.S.C. 154(b) by 845 days.

(21) Appl. No.: 12/355,943

(22) Filed: Jan. 19, 2009

(65) Prior Publication Data
US 2010/0180853 A1    Jul. 22, 2010

(51) Int. Cl.
*F02B 75/22* (2006.01)
*F16C 35/00* (2006.01)

(52) U.S. Cl. ............ 123/195 R; 384/432; 384/433

(58) Field of Classification Search .......... 384/429, 384/433, 912; 123/195 H, 195 R, 41.67, 123/195 C; 419/26, 27, 2, 78
See application file for complete search history.

(56) References Cited

U.S. PATENT DOCUMENTS

| | | | |
|---|---|---|---|
| 1,410,058 A | 3/1922 | Gentzel | |
| 4,209,209 A | 6/1980 | Stark | |
| 4,693,216 A * | 9/1987 | Ampferer et al. | 123/195 R |
| 4,848,293 A | 7/1989 | Sasada et al. | |
| 4,922,870 A | 5/1990 | Pietsch et al. | |
| 5,509,387 A | 4/1996 | Kaminski et al. | |
| 6,070,562 A * | 6/2000 | Van Bezeij | 123/195 R |
| 6,484,684 B2 | 11/2002 | Moller et al. | |
| 7,273,030 B2 * | 9/2007 | Yoshihara et al. | 123/195 R |
| 7,384,196 B2 | 6/2008 | Binder et al. | |

FOREIGN PATENT DOCUMENTS
FR    2878301    5/2006
* cited by examiner

*Primary Examiner* — Noah Kamen
(74) *Attorney, Agent, or Firm* — Jerome R. Drouillard; Julia Voutyras

(57) ABSTRACT

A bearing for an automotive engine includes a base having a first bearing segment formed therein, and a bearing cap removably mounted to the base, with the bearing cap including fastener towers in contact with the base. A second bearing segment extends between the fastener towers. A number of non-contact stiffening ribs extend parallel to the fastener towers. The stiffening ribs are attached to outboard portions of the fastener towers. The stiffening ribs cause the bearing cap to avoid excessive flexing and distortion, while at the same time avoiding fretting corrosion which would occur were the clamp loads of the cap to the base be reduced by materially increasing the size of the fastener towers.

14 Claims, 3 Drawing Sheets

AUTOMOTIVE ENGINE BEARING

CROSS REFERENCE TO RELATED APPLICATIONS

None.

BACKGROUND OF THE INVENTION

1. Field of the Invention

The present invention relates to a bearing construction which is particularly useful for mounting a crankshaft within an internal combustion engine.

2. Related Art

Internal combustion engines, particularly automotive internal combustion engines, typically use main bearing architectures in which a crankshaft is mounted to the cylinder block of the engine with bearing caps held in place with threaded fasteners. Conventional construction methods require that the cylinder block be machined separately to accept the bearing caps, which are themselves subject to separate manufacturing processes. Once both parts are machined, the cylinder block and bearing caps are joined together and then the main bearing bores are further machined, typically with boring and honing operations. Unfortunately, the necessity for separate bearing caps, produced by a completely separate manufacturing process, as well as the necessity for dowels and other devices to maintain the main bearing caps in proper alignment during the assembly of the engine and subsequent reassembly during service operations, renders the conventional block-and-cap construction both expensive and a burden to execute in high volume production.

An alternative method for producing bearing bores in a machine such as an internal combustion engine includes the use of fractured caps. In the fracturing process, the caps and the base of the bearing are cast as one piece. Then, following initial machining operations, the caps are fractured from the base, thereby producing a microscopically detailed parting line which promotes subsequent realignment of the caps upon their bases. Unfortunately, materials which are suitable for use with the fracturing process are frequently not optimal in terms of their physical properties. On point, it has been determined that a good deal of distortion occurs within main bearing bores in a firing engine when the fractured bearing caps are held in place with two fasteners. This distortion is shown in prior art FIG. 4 of this specification, in terms of a distorted main bearing bore experienced with the prior art bearing construction depicted in FIG. 6.

Although it would seem that additional stability could be imparted to the main bearing construction by making the fastener towers of the bearing cap larger, the fact is that a larger fastener tower would have the effect of reducing the contact force between the tower and the base, or cylinder block to which the cap is bolted, with the effect that fretting corrosion will occur as the bearing cap moves with respect to the cylinder block in response to firing pressure. This is a very undesirable situation. Another method to increase the bearing's strength is to add an additional fastener to the bearing caps so that four fasteners, instead of two, hold the bearing cap in place. This has the unfortunate effect of greatly increasing the cost in terms of materials and machining, as well as increasing the space required for the bearing cap, as well as its weight. All of these characteristics are undesirable.

It would be desirable to provide a fracture-separated main bearing cap which has strength characteristics approaching those of conventional caps made from materials which are not fractured from the bearing base, coupled with the ability to be fastened into an engine with only two fasteners.

SUMMARY OF THE INVENTION

According to an aspect of the present invention, a bearing for an automotive engine includes a base having a first bearing segment formed therein, and a bearing cap removably mounted to the base. The bearing cap includes a number of fastener towers in contact with the base and a second bearing segment extending between the fastener towers, with the second bearing segment having a semi-circular bore therein. A number of stiffening ribs extend parallel to the fastener towers. The stiffening ribs are attached to outboard portions of the fastener towers. According to another aspect of the present invention, the present bearing cap is preferably one piece. The fastener towers preferably extend from the base of the bearing to a location beyond the portion of the semi-circular bore which is farthest from the base. On the other hand, the stiffening ribs preferably extend along one of the fastener towers from a location apart from the base to a location beyond the portion of the semi-circular bore which is farthest from the base.

According to another aspect of the present invention, the base and bearing cap are preferably initially formed as one piece, with the cap being separated subsequently from the base, preferably by fracturing, and with the cap being removably mountable thereafter to the base with a number of cap screws extending through the fastener towers.

According to another aspect of the present invention, the portion of the fastener towers in contact with the base define a plane, with each of the stiffening ribs extending along one of the fastener towers from a location removed from the plane to a location beyond the portion of the semi-circular bore which is farthest from the plane. In other words, the stiffening ribs do not extend along the full length of the fastener towers, but stop short of contact with that portion of the bearing integrated with the cylinder block. This geometry increases the clamping pressure of the bearing cap by decreasing the area of the cap in contact with the cylinder block, while maintaining the fastener load.

According to another aspect of the present invention, a cylinder block for an automotive engine includes a number of cylinder bores, and a main bearing base formed in a cylinder block adjacent to cylinder bores, with the main bearing base having a number of first bearing segments formed therein, and with each of the first bearing segments having a first generally semi-circular bore. A number of main bearing caps are removably mounted to the base, with the bearing caps each including a number of fastener towers, with each of the towers having a bore for accepting a threaded fastener, and with a second bearing segment extending between the fastener towers, with the second bearing segment having a second semi-circular bore therein. A number of stiffening ribs extend parallel to the fastener towers, with the stiffening ribs being attached to outboard portions of the fastener towers, wherein each of the stiffening ribs extends along the fastener towers from a location apart from the base, to a location beyond the portion of the second semi-circular bore which is farthest from the base. As before, the bearing caps are formed initially with the base as one piece, with the caps being separated subsequently from the base by fracturing, and with the bearing caps being mountable to the base thereafter with a number of cap screws extending through the bores within the fastener towers.

It is an advantage of an automotive engine bearing according to the present invention that an economical production process including fracturing of the main bearing caps from the cylinder block may be employed, while at the same time providing bearing structures having excellent integrity and the ability to provide long service life in real-world automotive conditions.

It is another advantage according to an automotive engine bearing system according to the present invention that the present bearings may be produced with a minimal number of machine operations, as compared with prior art bearing assemblies.

It is another advantage according to an automotive engine bearing system according to the present invention that fretting corrosion caused by deflection of a bearing cap as a result of engine firing loads is prevented without the costly alternative of four-bolt main bearing caps. In this manner, added weight and cost are avoided.

Other advantages, as well as features of the present invention, will become apparent to the reader of this specification.

DETAILED DESCRIPTION OF THE PREFERRED EMBODIMENTS

Figure 1:
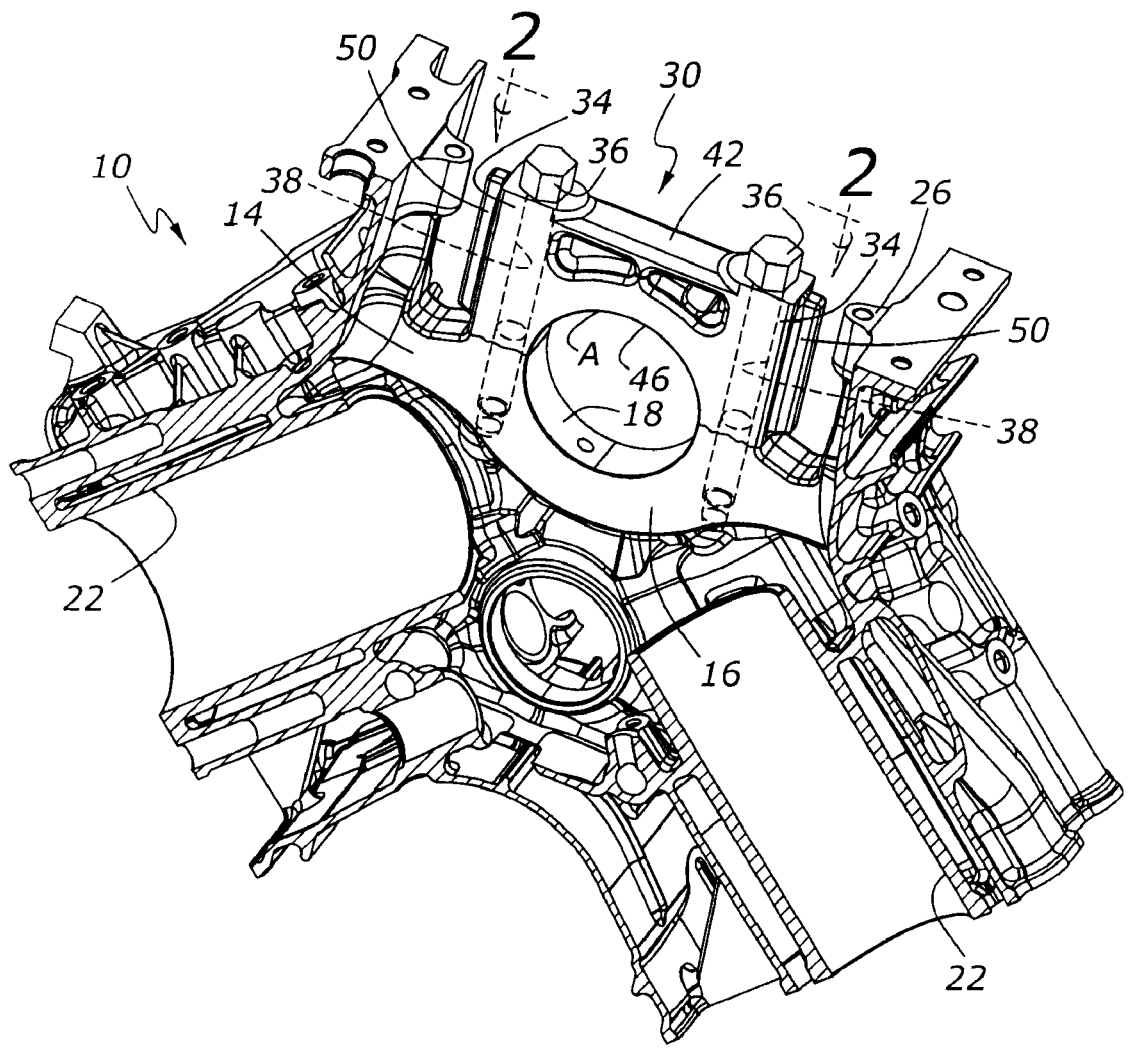
FIG. 1 is a perspective view of a portion of a cylinder block including a bearing system according to the present invention.

Referring to the Figures, wherein like numerals indicate like or corresponding parts throughout the several views, as shown in FIG. 1, cylinder block 10 includes a bearing base, 14, including a first bearing segment 16, having a semi-circular bore 18 formed therein. A bearing cap, 30, is mounted to bearing base 14 with cap screws 36. Cap screws 36 pass through bores 38 formed within fastener towers 34, which extend from base 14 to the hexagonal heads of cap screws 36. A second bearing segment, 42, extends between fastener towers 34 and includes a semi-circular bore, 46. Taken together, semi-circular bore 46 and semi-circular bore 18 define a circular bore for an engine crankshaft (not shown). Although only a single main bearing is illustrated in FIG. 1, those skilled in the art will appreciate in view of this disclosure that most engines will utilize at least two such main bearings, if not five, or six, or more. This detail is committed to those wishing to employ the present invention.

Base 14 and bearing cap 30 are initially formed as one piece, preferably from a material such as compacted graphite iron, with cap 30 being separated by fracturing from base 14, and with cap 30 being removably mountable thereafter to base 14 with cap screws 36 extending through fastener towers 34.

Figure 2:
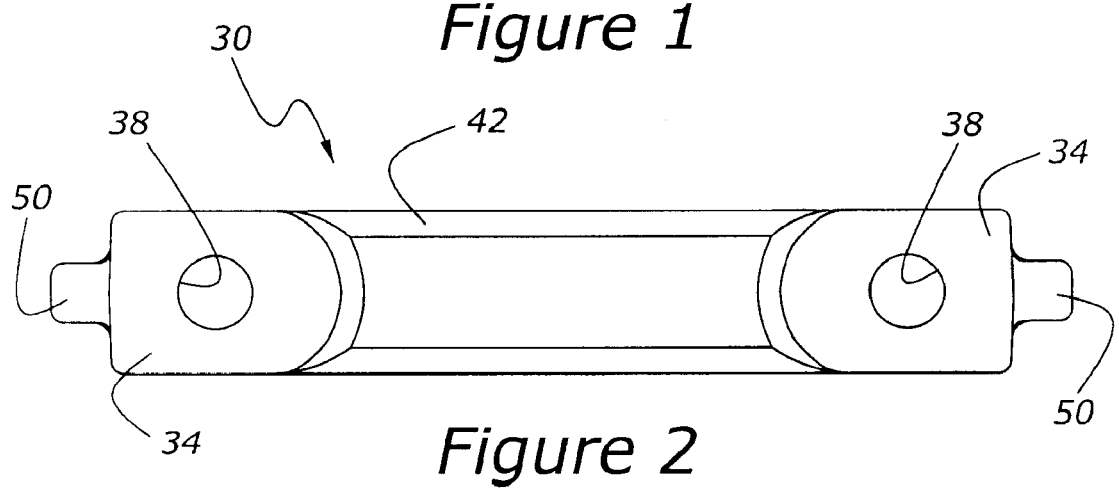
FIG. 2 is a plan view of a bearing cap according to the present invention, taken along the line 2-2 of FIG. 1.
Figure 3:
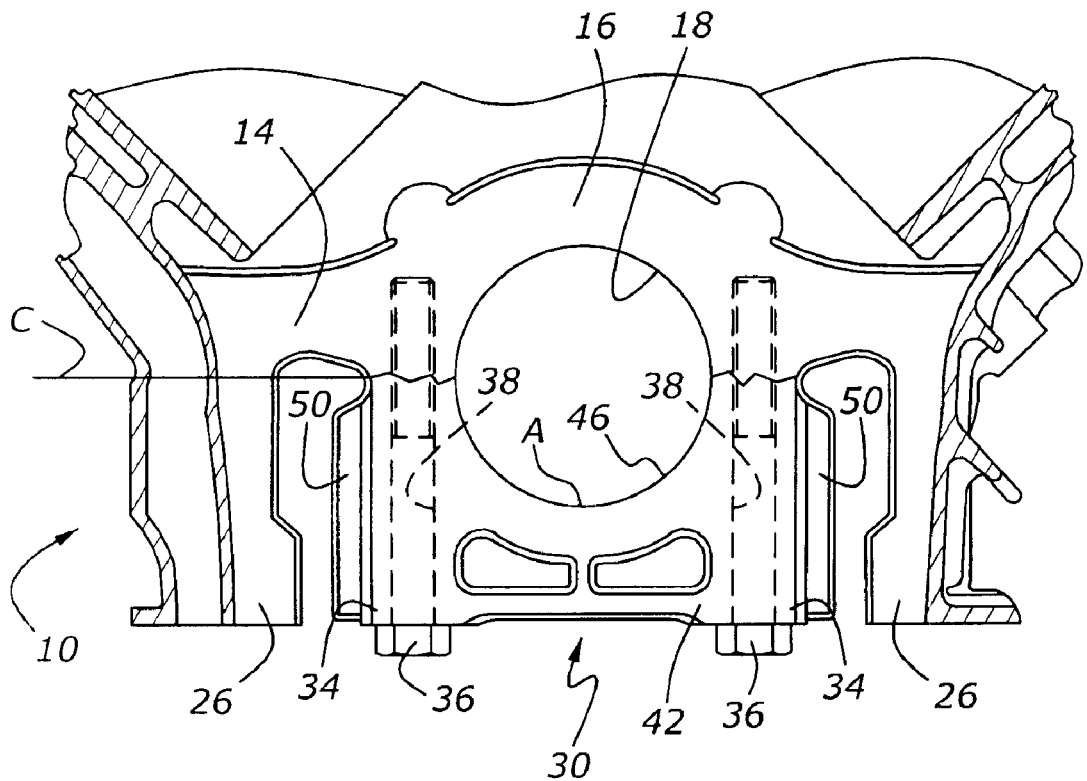
FIG. 3 is a section of a cylinder block having a bearing construction according to the present invention.
Figure 6:
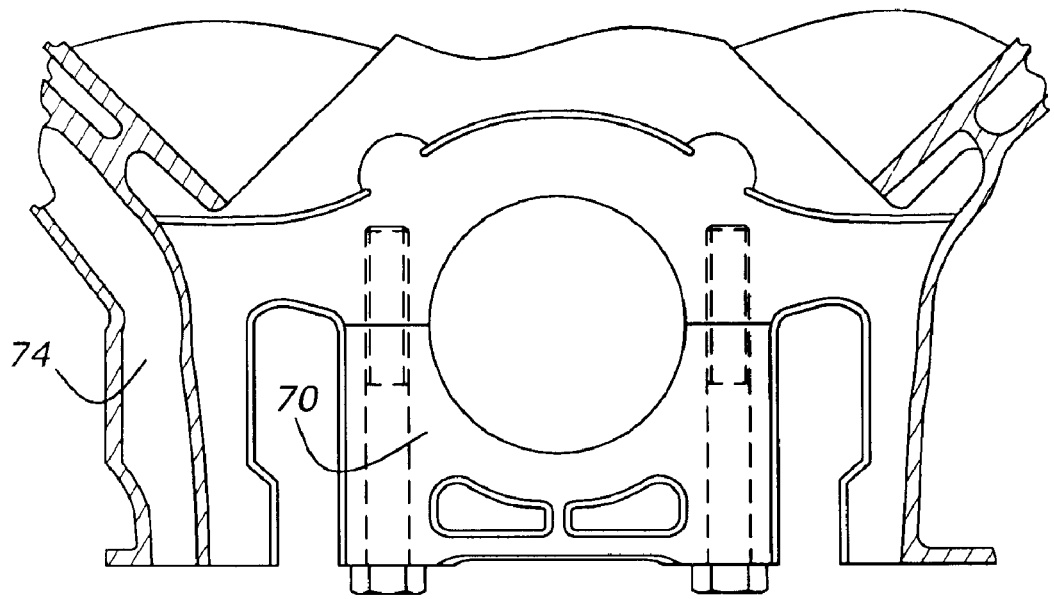
FIG. 6 shows a prior art main bearing cap of FIG. 4.

Main bearing cap 30 also includes non-contacting stiffening ribs, 50, which extend parallel to fastener towers 34 from a location apart from base 14, to a location which is well past the uppermost extent of semi-circular bore 46, which is shown at "A" in FIGS. 1 and 3. In other words, stiffening ribs 50, which preferably have the quadrilateral cross-section shown in FIG. 2, and which are aligned parallel with fastener bores 38, are shown in FIGS. 1 and 3 as being separated from base 14. This separation extends from plane C of FIG. 3, where plane C is defined by that portion of fastener towers 34 which contact base 14. It is important that stiffening ribs 50 do not contact base 14 because this permits fasteners 34 to develop a sufficient clamp load between the portion of fastener towers 34 which does contact base 14, to prevent fretting of base 14 and cap 30. Because stiffening ribs 50 do not touch base 14, the appellation "non-contacting" is an appropriate descriptor for ribs 50.

Figure 4:
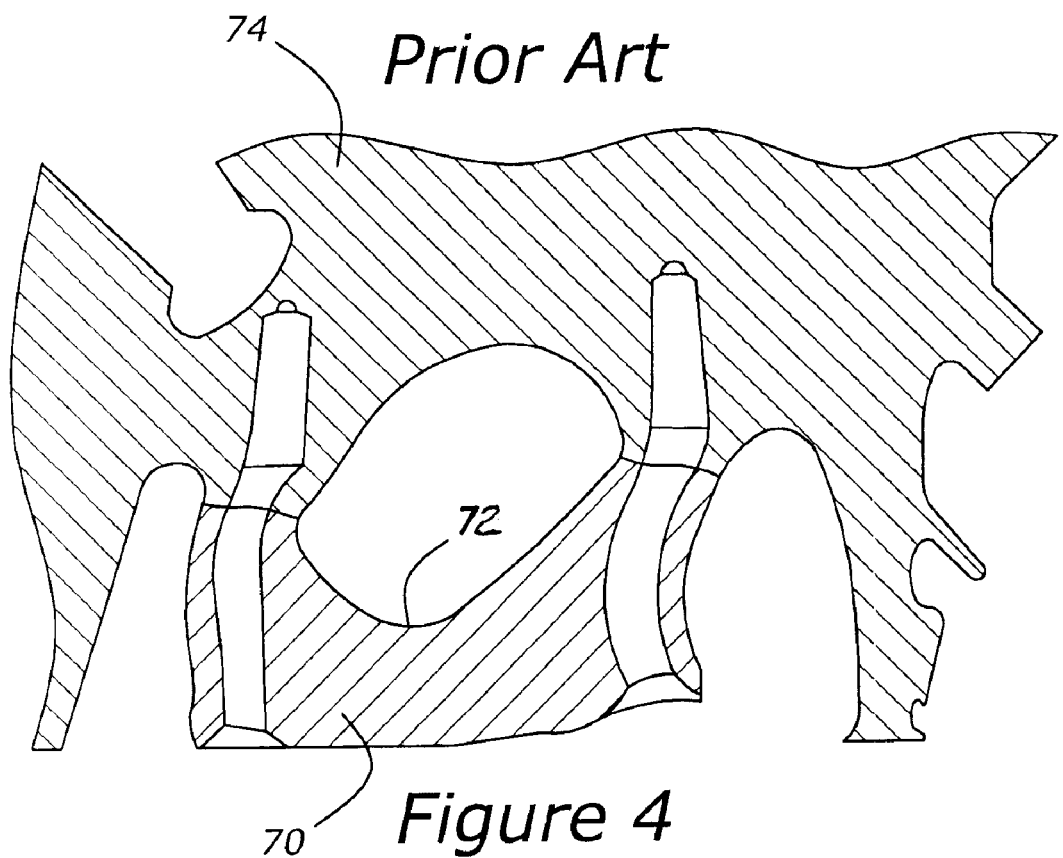
FIG. 4 illustrates a prior art cylinder block being distorted during engine firing.
Figure 5:
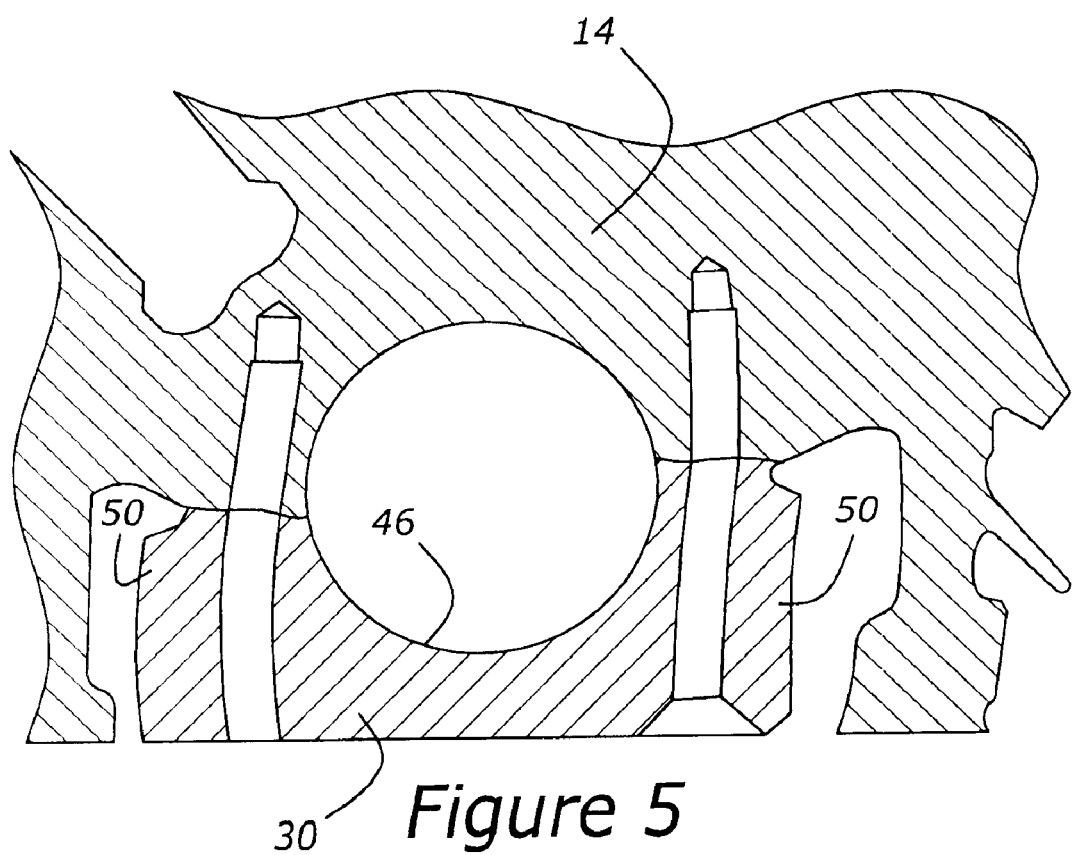
FIG. 5 shows an engine block built according to the present invention during similar cylinder firing to that shown in FIG. 4, but showing reduced distortion.

A comparison of FIGS. 4 and 5 evidences the beneficial effect of the present construction because it is discernable that the distortion of the main bearing bores 46 and 72 are grossly different. In other words, the distortion suffered by main bearing bore 46, with a main bearing cap 30 according to the present invention, is much less than the distortion suffered with a cap of conventional construction, 70 having bore 72, and shown in FIG. 4 as being attached to cylinder block 74. The cap shown in prior art FIG. 4 may be separated by fracturing, but does not have the stiffening ribs added by the present invention and more specifically does not have a non-contacting stiffening rib according to the present invention.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A bearing for an automotive engine, comprising:
   a base having a first bearing segment formed therein; and
   a bearing cap removably mounted to said base, with said bearing cap comprising:
      a plurality of fastener towers in contact with said base;
      a second bearing segment extending between said fastener towers, with said second bearing segment having a semicircular bore therein; and
      a plurality of stiffening ribs extending parallel to said fastener towers, with said stiffening ribs being attached to outboard portions of the fastener towers.

2. A bearing according to claim 1, wherein said bearing cap is one piece.

3. A bearing according to claim 1, wherein each of said fastener towers extends from said base to a location beyond the portion of said semicircular bore which is farthest from said base.

4. A bearing according to claim 1, wherein each of said stiffening ribs extends along one of said fastener towers from a location apart from said base to a location beyond the portion of said semicircular bore which is farthest from said base.

5. A bearing according to claim 1, wherein said bearing cap is formed initially with said base and then separated from said base by fracturing.

6. A bearing according to claim 1, wherein said base and said bearing cap are both formed from compacted graphite iron.

7. A bearing according to claim 1, wherein said base and said bearing cap are initially formed as one piece, with said cap being separated subsequently from said base, and with said cap being removably mountable thereafter to said base with a plurality of cap screws extending through said fastener towers.

8. A bearing according to claim 7, wherein said bearing cap is separated from said base by fracturing.

9. A bearing according to claim 1, wherein said stiffening ribs have a generally quadrilateral cross sectional configuration.

10. A bearing according to claim 1, wherein said first bearing segment has a semicircular bore formed therein.

11. A bearing according to claim 1, wherein said base is incorporated within a cylinder block.

12. A bearing according to claim 1, wherein the portion of said fastener towers in contact with said base define a plane, with each of said stiffening ribs extending along one of said fastener towers from a location removed from said plane, to a location beyond the portion of said semicircular bore which is farthest from said plane.

13. A bearing for an automotive engine, comprising:
a base having a plurality of first bearing segments formed therein, with said first bearing segments each comprising a first generally semicircular bore; and
a plurality of bearing caps removably mounted to said base, with said bearing caps comprising:
a plurality of fastener towers, with each of said towers having a bore for accepting a threaded fastener;
a second bearing segment extending between said fastener towers, with said second bearing segment having a second semicircular bore therein; and
a plurality of non-contacting stiffening ribs extending parallel to said fastener towers, with said stiffening ribs being attached to outboard portions of the fastener towers, and wherein each of said stiffening ribs extends along one of said fastener towers from a location separated from said base to a location beyond the portion of said second semicircular bore which is farthest from said base;
wherein said bearing caps are formed initially with said base as one piece, with said caps being separated subsequently from said base by fracturing, and with said bearing caps being mountable to said base thereafter with a plurality of cap screws extending through said bores within said fastener towers.

14. A cylinder block for an automotive engine, comprising:
a plurality of cylinder bores;
a main bearing base formed in the cylinder block adjacent said cylinder bores, with said main bearing base having a plurality of first bearing segments formed therein, with said first bearing segments each comprising a first generally semicircular bore; and
a plurality of main bearing caps removably mounted to said base, with said bearing caps comprising:
a plurality of fastener towers, with each of said towers having a bore for accepting a threaded fastener;
a second bearing segment extending between said fastener towers, with said second bearing segment having a second semicircular bore therein; and
a plurality of non-contacting stiffening ribs extending parallel to said fastener towers, with said stiffening ribs being attached to outboard portions of the fastener towers, and wherein each of said stiffening ribs extends along one of said fastener towers from a location apart from said base to a location beyond the portion of said second semicircular bore which is farthest from said base;
wherein said bearing caps are formed initially with said base as one piece, with said caps being separated subsequently from said base by fracturing, and with said bearing caps being mountable to said base thereafter with a plurality of cap screws extending through said bores within said fastener towers.

\* \* \* \* \*